May 16, 1933.  G. G. CONNER  1,909,613
PLANT ERADICATOR
Original Filed Jan. 7, 1929

Inventor:
Glenn G. Connor
By
Wilson & McCanna
Attys.

Patented May 16, 1933

1,909,613

UNITED STATES PATENT OFFICE

GLENN G. CONNER, OF ROCKFORD, ILLINOIS

PLANT ERADICATOR

Application filed January 7, 1929, Serial No. 330,853. Renewed September 26, 1932.

This invention relates to improvements in plant eradicators for use in destroying undesirable and noxious weeds such as dandelions, burdock, thistles and the like where it is inexpedient to destroy all vegetation in the area affected or where local treatment is desired for any other reason. My invention is particularly applicable to use upon lawns, golf courses, gardens and the like where noxious or undesirable plant life is apt to take root and where general reworking of the soil surface is impractical. Tools to be used for this purpose have, from time to time, appeared on the market but they have been generally unsatisfactory. Some have required the operator to work on his hands and knees. Obviously, such a tool is impractical in this era of high priced labor and large golf courses. Others, while designed to permit the operator to work standing, have neglected other requisites of a practical tool for this purpose.

With the foregoing in mind I have aimed to provide a generally improved and practical means for eradicating plant life which is operable from a standing position.

I have also aimed to provide a means for placing a plant-killing liquid into the roots of individual weeds and so confining the application of the liquid as to cause the death of no appreciable amount of surrounding plant life.

Other objects including the provision of a container for holding toxic liquids, a plunger, a plunger rod and spring, a handle, and a plurality of stylets will become evident to those skilled in the art from an examination of the following description and the accompanying drawing, in which—

Figure 1:
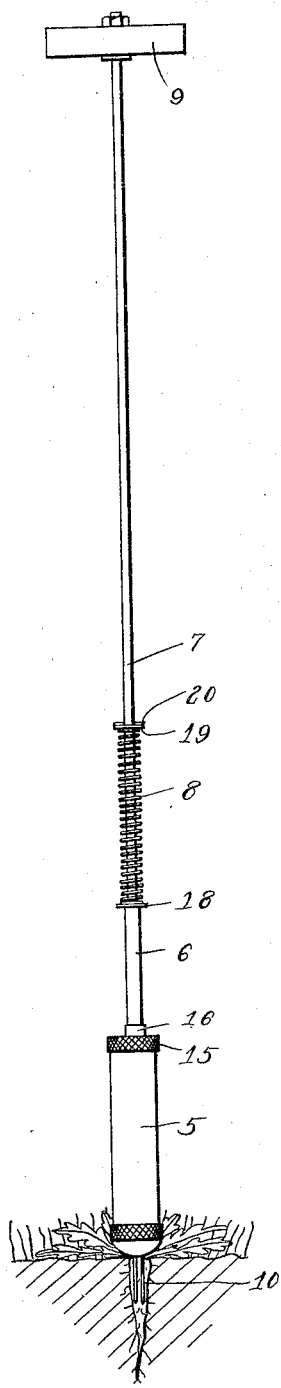
Figure 1 is an elevation showing the manner in which the invention is used.

The invention is designed primarily to be of use in eradicating weeds such as dandelions, burdocks, thistles and the like from lawns, golf courses, gardens, fields and the like where the weeds are mixed with desirable plant life and where the surface of the soil may not be reworked. The only practical way to remove these objectionable plants seems to be to poison them, which is very effective if properly carried out. It is, however, very difficult to selectively poison the plants in this manner without also killing the grass and other desirable vegetation immediately surrounding the plants. I have found that very small quantities of many chemicals are sufficient to cause the death of weeds in a single treatment, if the chemical is properly applied, without materially affecting the surrounding vegetation of the soil. In order, however, to accomplish this the toxic substance must be confined as nearly as possible to the plant and its roots, and there must be no excess of solution around the plant roots. To accomplish this in a practical manner I have provided a liquid container designated generally by 5, Fig. 1, which may be made of corrosion resisting metal if desired, a plunger rod 7, a plunger rod guide 6, a plunger rod spring 8, a handle 9 and stylets 10. The overall length of the eradicator is sufficient to permit the operator to use the same in a standing position. The eradicator is grasped by the handle 9 and the lower end of the container placed directly over the roots of the weed as shown in Fig. 1. The handle is then pushed downward forcing the stylets 10 and a small amount of solution into the roots of the plant.

Figure 2:
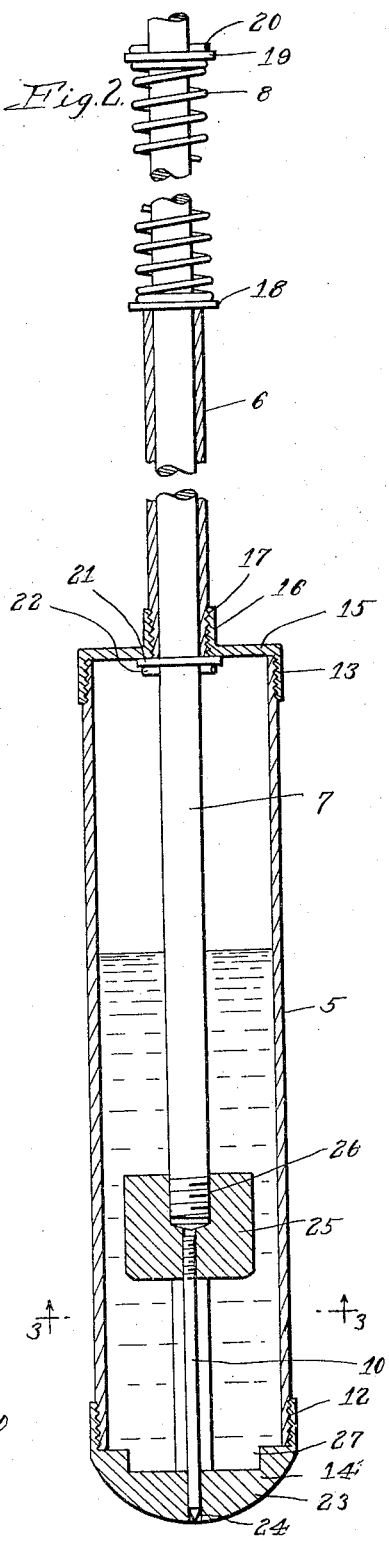
Fig. 2 is a section through the liquid container and plunger rod guide showing the plunger rod and spring.
Figure 3:
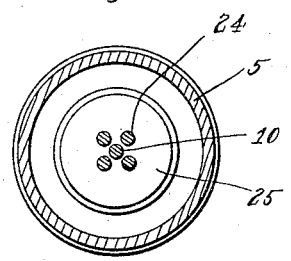
Fig. 3 is a section on the line 3—3 of Fig. 2.

Referring now to Fig. 2 in which the details of construction are more clearly shown, the container consists of a cylinder 11 having attached thereto by means of threads 12 and 13 end members 14 and 15 the latter being bottom and top respectively. The top end 15 of said cylinder has a cylindrical collar 16 provided with an internal thread 17 into which the plunger rod guide 6 is turned. The plunger rod guide serves to guide the plunger rod and holds it firmly on its course; it serves to support the spring 8; and it prevents liquid from being drawn out of the container on the plunger rod. A washer 18 is placed around the plunger rod 7 and rests upon the plunger rod guide to support the spring 8. The spring 8 is held under compression by means of a second washer 19 held in position by a pin 20 suitably located in the plunger rod. An upward stop for the plunger rod is provided by a washer 21 and pin 22 suitably located in the plunger rod within the container.

The bottom end 14 of the container has a spherical bottom surface 23 containing a plurality of holes 24 to permit the passage of stylets 10. The stylets fit the holes very closely and are seated in a plunger 25 which is in turn attached to the plunger rod by means of threads 26. The plunger is adapted to cooperate with a short cylinder 27 near the end of its downward stroke.

Attention is directed to the fact that liquid is not permitted to flow from the container to permeate the ground surrounding the plant but is placed in small quantities at the point where most effective. The only openings in the bottom end 14 of the container are those through which the stylets 10 move, and they are but very little larger than the stylets themselves. The liquid, while it normally will now flow out around the stylets, is discharged in two ways. When the plunger rod is depressed and the stylets forced down into the roots of the plant, a thin layer of the toxic liquid surrounds the stylets as they emerge from the container. It will be observed that this is not liquid in the sense of being free to flow but exists as a surface film on the metal stylets and is carried downward into the roots of the plant through the full length of the stylet incision coating the walls of the incision thus made with a thin layer of the toxic material. However, near the surface of the ground the root of the plant is larger than at greater depths and requires a slightly larger amount of the toxic liquid than can be provided by the surface film on the stylets. To supply the larger amount and to supply it at the end of the incision stroke after the openings into the root have been cut the plunger 25 and short cylinder 27 are provided. When the downward stroke is practically completed the plunger enters the cylinder placing the liquid therein under pressure and forcing a small amount thereof out around the stylets. The liquid thus forced out is relatively small in amount and follows the stylets downward into the upper root of the plant.

In conclusion, the present device, instead of piercing the roots with a needle or gashing the same with a blade and thereafter discharging some poisonous liquid, which is not certain of reaching the place intended, has a stylet projected from the container covered with a film of the poisonous liquid and arranged to be inserted in the root so as to carry this poison to the very heart of the root where it will be certain of killing the weed. I have found that a very small amount of poison injected in this way is enough to cause the weed to wither and die. In order, however, to make assurance doubly sure, I prefer to provide a plurality of these stylets so as to introduce the poison into the root at a number of places. In that way even the hardiest weed can be gotten rid of and once it is treated, there is no likelihood that it will require any further attention. The use of a number of stylets has another advantage, and that is, that if desired, after the stylets have been inserted, the device can be turned slightly back and forth to enlarge the holes made by the stylets and work off in the root every vestige of poison on the stylets, besides making sure that when the plunger is forced down as far as it will go, the additional poisonous liquid that is discharged along the stylets through the stylet openings by reason of the plunger 25 entering the cylinder 27 will be carried far into the root, all with a view to making certain that the weed will be exterminated. In other devices where only a single needle was used, there was no such advantage, and, as stated before, they did not provide for inserting the needle with the film of poison thereon. In short, the device of my invention operates on the principle that a small amount of poison properly injected will do a better job than a larger amount discharged in a more or less haphazard manner, and there is, furthermore, less danger of damage to the rest of the lawn when the poison is carried properly and directly into the root of the weed to be killed, instead of being allowed to spread to the roots of the surrounding grass. The discharge under pressure of an additional small amount of the lethal fluid while the stylets are piercing the root is rendered most effective because this fluid, being discharged about the stylets through the stylet openings, will naturally flow along the stylets into the root. In other words, there is nothing haphazard about this discharge of fluid and the amount is predetermined by reason of the shallowness of the cylinder 27. Obviously, very little fluid is discharged in this way and, as just stated, it is more or less certain of reaching its destination because the stylets are there to serve to guide it to the proper place.

While I have described in detail a particular construction I am aware that numerous changes may be made without departing from the essence of my invention as described and claimed in the following claims. For example, it should be understood that while reference is made to "stylets" any suitable form of root piercing members could be used, other than the specific type herein shown.

I claim:

1. A weed exterminator comprising in combination a container for poisonous liquid, a rod having said container carried thereon at its lower end, the said rod being preferably of sufficient length to permit use of the device while standing, the upper end of the rod providing a handle to serve in placing the container wherever desired, said container having a small opening in the lower end thereof, said rod projecting through the upper end of said container, and a stylet on the lower end of said rod within the container having the end thereof fitting snugly in said opening to serve as a closure therefor, the rod being arranged to be moved downwardly relative to the container when the same rests on the ground whereby to project the stylet through the opening with a film of poisonous liquid thereon to be carried into the root of a weed pierced by the stylet, and the upward movement of the rod relative to the container being limited whereby to prevent withdrawal of the stylet from the opening and permit raising the container by means of the rod.

2. A weed exterminator comprising in combination a container for poisonous liquid, a rod having said container carried thereon at its lower end, the said rod being preferably of sufficient length to permit use of the device while standing, a handle on the upper end of said rod to serve in placing the container wherever desired and also facilitate manipulation of the rod, said container having a plurality of openings provided in the lower end thereof placed close together, said rod projecting through the upper end of said casing, and a plurality of stylets on the lower end of the rod within the container fitting snugly in said openings to serve as closures therefor, said rod being arranged to be moved downwardly relative to the container when the same rests on the ground whereby to project the stylets through the openings with a film of poisonous liquid thereon to be carried into the root of a weed pierced by the stylets, and the upward movement of the rod relative to the container being limited whereby to prevent withdrawal of the stylets from the openings and permit raising the container by means of the rod.

3. A device as set forth in claim 1 including a plunger on the rod within the container, and a shallow depression provided in the lower end of the container communicating with the stylet opening and arranged to snugly receive the plunger when the rod is moved downwardly as far as it will go, whereby an additional amount of poisonous liquid is caused to be expelled under pressure from the container through the stylet opening along the stylet into the root of the weed pierced thereby.

4. A device as set forth in claim 2 including a plunger on the rod within the container, and a shallow depression provided in the lower end of the container communicating with the stylet openings and arranged to snugly receive the plunger when the rod is moved downwardly as far as it will go, whereby an additional amount of poisonous liquid is caused to be expelled under pressure from the container through the stylet openings along the stylets into the root of the weed pierced thereby.

In witness of the foregoing I affix my signature.

GLENN G. CONNER.